United States Patent [19]

Schlagmüller

[11] Patent Number: 4,728,315
[45] Date of Patent: Mar. 1, 1988

[54] TWO-SPEED DRIVE WITH TWO BELT PULLEYS AND A CENTRIFUGAL TYPE FRICTION-CLUTCH COUPLING

[75] Inventor: Walter Schlagmüller, Schwiebergingen, Fed. Rep. of Germany

[73] Assignee: Robert Bosch GmbH, Stuttgart, Fed. Rep. of Germany

[21] Appl. No.: 926,961

[22] Filed: Nov. 3, 1986

[30] Foreign Application Priority Data

Nov. 14, 1985 [DE] Fed. Rep. of Germany ....... 3540408

[51] Int. Cl.$^4$ .......................... F16H 7/02; F16D 21/04
[52] U.S. Cl. ......................................... 474/13; 474/84; 192/104 B
[58] Field of Search ..................................... 474/11-13, 474/84, 85; 192/104 B

[56] References Cited

U.S. PATENT DOCUMENTS 2,917,935 12/1959 Haug ........................................ 474/84
4,450,942 5/1984 Takefuta et al. ............ 192/104 B X Primary Examiner—Stephen J. Novosad
Assistant Examiner—Thuy M. Bui
Attorney, Agent, or Firm—Michael J. Striker

[57] ABSTRACT

A two-speed drive for a generator of an internal combustion engine includes two belt pulleys and centrifugal type friction-clutch coupling. The coupling has an actuating lever formed as a flyweight and pivotally supported against the force of a spring on a pin connected either to the belt pulley of a smaller diameter or to the generator or to the generator fan. The coupling can be mounted either to the driven side of the generator or to its driving side. A coupling jaw pivotally supported on the actuating lever cooperates with a friction surface provided on the housing of the coupling. An angle formed between the direction of action of the resulting normal force acting on the coupling jaw and the line between the pivot point of the lever and the pivot point of the coupling jaw corresponds to a friction angle at static friction.

5 Claims, 6 Drawing Figures

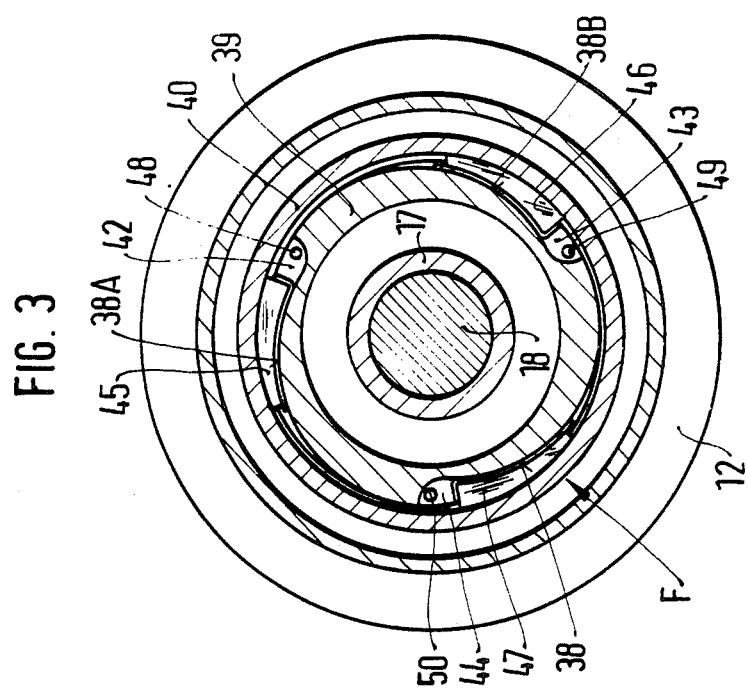
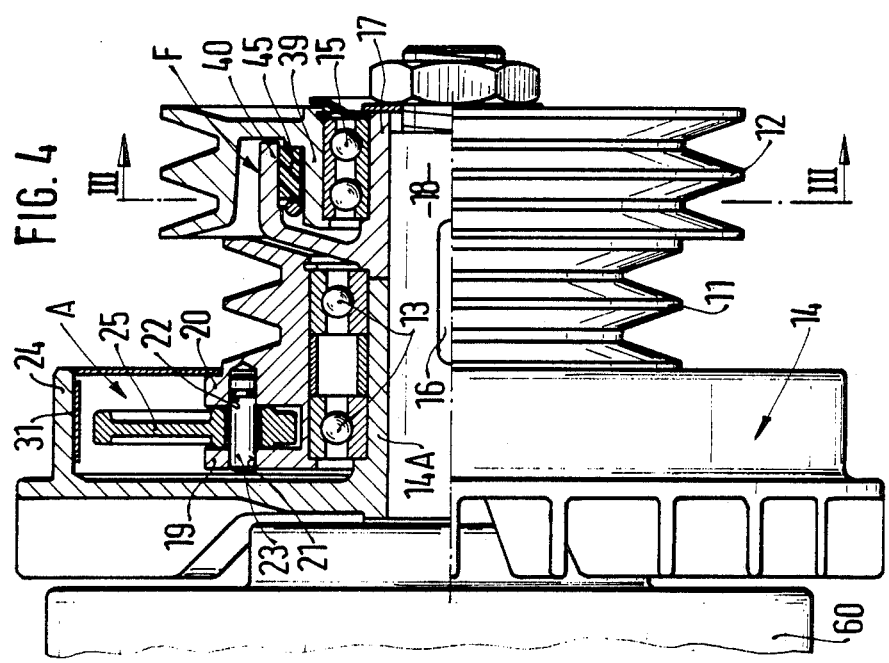

TWO-SPEED DRIVE WITH TWO BELT PULLEYS AND A CENTRIFUGAL TYPE FRICTION-CLUTCH COUPLING

BACKGROUND OF THE INVENTION

The present invention relates to a two-speed drive for a generator of an internal combustion engine.

Two speed drives of the type under discussion include two belt pulleys of different diameters and a centrifugal type friction-clutch coupling in which an actuating lever is formed as a freewheel and provided with a jaw having a friction coating cooperating with another friction coating provided on the other structural component of the coupling.

The drive of the foregoing type serves to drive auxiliary aggregates, particularly a generator in a motor vehicle. The driving process takes place at low motor speeds via a first belt pulley with the centrifugal type friction-clutch coupling whereby the coupling is in engaged or coupled position. At higher speeds the coupling is uncoupled and the free-wheeling assembly provided at the second belt pulley (back pulley) serves to drive the auxiliary aggregate only by the second belt pulley. This drive however is limited in use and is quite expensive.

SUMMARY OF THE INVENTION

It is an object of the present invention to provide an improved two-speed drive of the type having two belt pulleys and a centrifugal type friction-clutch coupling.

It is a further object of the invention to provide a two-speed drive in which various possibilities of driving auxiliary aggregates driven by the internal combustion engine would be provided by the arrangement of the coupling. Here, only one additional belt pulley with tighteners is required.

These and other objects of the invention are attained by a two-speed drive for a generator driven by an internal combustion engine, comprising two coupling belt pulleys of different diameters; a centrifugal type friction-clutch coupling, said coupling including a friction surface, an actuating lever formed as a flywheel and having a first pivot axis on which said lever is pivotally supported, a spring acting on said lever against a centrifugal force and a coupling jaw connected to said lever so as to be pressed thereby against the friction surface of said coupling, said lever having a second pivot axis, said coupling jaw being pivotally supported on said second pivot axis, said first and second pivot axes lying on a straight line which forms with a resulting normal force ($F_N$) of said coupling jaw acting against said friction surface an angle which corresponds to a friction angle ($\phi$) which occurs at a static friction between said coupling jaw and said friction surface; and free-wheeling means positioned between said two coupling belt pulleys, the coupling may be mounted either at a driving side or a driven side of the generator.

The pivotable actuating lever may be pivoted either relative to the belt pulley of a smaller diameter or to a housing of a fan provided on the generator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a sectional view along line III—III of FIG. 4;

FIG. 4 is an axial sectional view of the drive;

DETAILED DESCRIPTION OF THE PREFERRED EMBODIMENTS

Figure 1:
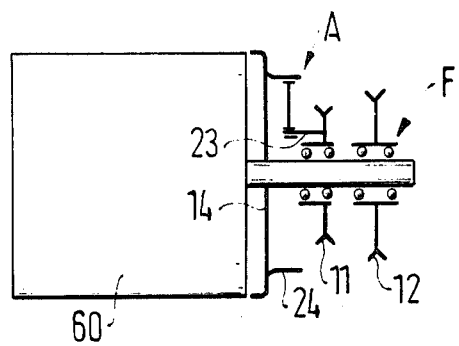
FIG. 1 is a schematic view of the two-speed drive of the first embodiment of the invention.

Referring now to the drawings in detail, and firstly to FIGS. 1–4 thereof, it will be seen that a generator 60 is driven via a crank shaft of a non-illustrated internal combustion engine, and by at least one two-speed drive which has a first belt pulley 11 and a second belt pulley 12 which has a substantially greater diameter than that of the belt pulley 11. The belt pulley 12 is supported on a hub 17 via a double ball bearing 15. Hub 17 is itself mounted on a generator shaft 18 for a joint rotation therewith with the aid of a key 16. The belt pulley 11 is supported on a hub 14A of a fan wheel 14 by means of a second ball bearing 13. A coupling housing 24 for a centrifugal type friction-clutch coupling is formed on the fan wheel 14.

Figure 2:
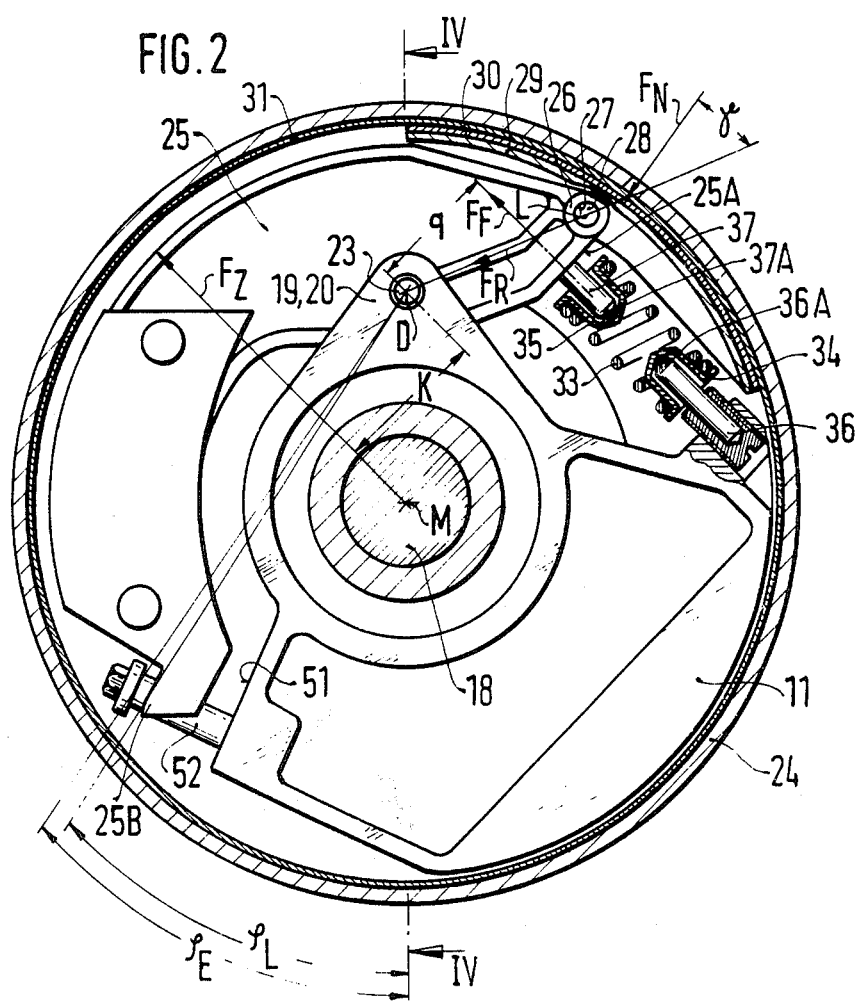
FIG. 2 is a partially sectional front view of a coupling pulley with a free-wheeling.
Figure 5:
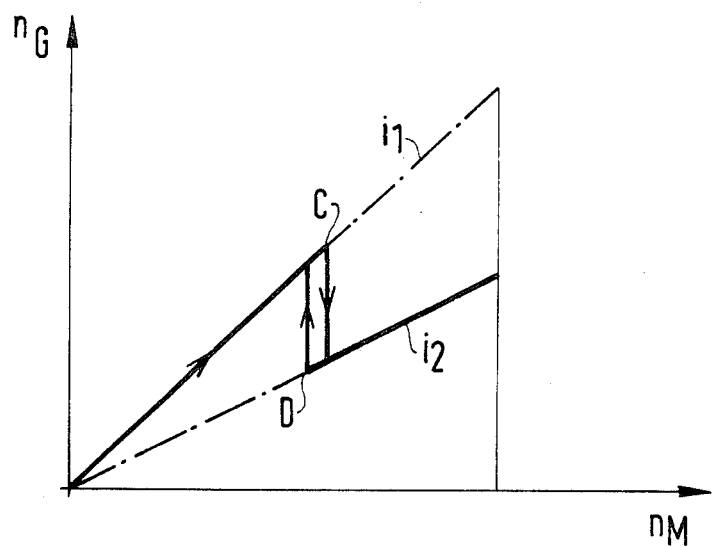
FIG. 5 is a speed graph for the drive of FIG. 1.
Figure 6:
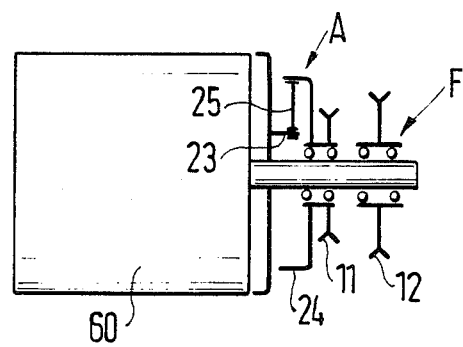
FIG. 6 is a schematic view of the second embodiment of the two-speed drive of the invention.

Generator 60 can be driven with two different speeds by two belt pulleys 11 and 12, respectively. FIG. 1 schematically shows the two-speed drive while FIG. 5 illustrates a diagram or graph of the speed for the drive shown in FIG. 1. FIGS. 2 through 4 show in detail the structure of the coupling.

At the upper part of the rotating coupling housing 24, are provided two webs or projections 19, 20 which are formed integral or of one-piece with the belt pulley 11 and have aligned bores 21, 22 in which a pin 23 is received. An actuating lever 25 is pivotally supported on pin 23. This lever is curved within the coupling housing 24 (FIG. 2) and extends over about a half of the periphery of the coupling housing. Lever 25 is, at the same time, formed as a flyweight and serves as an organ for actuating the coupling by a centrifugal force.

At one end of the lever 25 there is a lug 26 having a bore 27 in which a pin 28 is rigidly supported. A coupling jaw 29, provided with a friction coating 30, is pivotally supported on the pin 28. The coupling jaw 29 has the shape of a circular segment and extends over less than one fourth of the periphery of coupling housing. The friction coating 30 of the coupling jaw 29 cooperates with a friction surface 31 provided on the inner face of the coupling housing 24. A resulting normal force $F_N$ of the friction force extends through a central point M of the coupling housing 24. A central point L of the pin 28 of the lever 25 is offset somewhat to the left from the line of action of the normal friction force $F_N$. An imaginary connection line which connects central point L with an axis D of the pin 23 forms with the line of action of force $F_N$ an angle $\gamma$ which is defined as a construction angle.

The centrifugal force acting on the lever 25 acts against the force of a compression spring 33. The latter is supported between two cup-shaped spring guides 34 and 35. The spring guide 34 is positioned on an apex of a threaded bolt 36 which is connected to the coupling housing 24. The second spring guide 35 is positioned on an apex 37A of a bolt 37 which is connected to an end surface 25A of lever 25 and aprroximately inside the lug 26. The distance between the direction of action of the spring force $F_F$ and the central point D of pin 23 is designated by q. A resulting centrifugal force is denoted by $F_Z$. This force has a lever arm K relative to the point D.

The resulting friction force is designated by $F_R$ and acts at the construction angle $\gamma$ through points L and D.

Referring back to FIG. 1 and also to FIG. 3 it is seen that a hub or collar 40, which is formed on hub 17, extends in the belt pulley 12. The latter has a circular portion or extension 39 extending inwardly of the hub 40 and having three recesses 38, 38A 38B spaced from each other in the circumferential direction whereby three sickle-shaped chambers 42, 43 and 44 are formed in the hub 40. A clamping wedge 45, 46, 47 is positioned in each of these chambers. The clamping wedge can be held in a predetermined position against stop pins 48 to 50. The hub or collar 40, at the same time, forms a friction surface for the clamping wedges 45, 46, 47. These structural components form a free-wheeling assembly F.

A screw 52 is arranged at an end sufface 51 of the web 19 at the side opposite to the threaded bolt 36. Screw 52 serves as an end abutment for the lever 25 of the flyweight constituted by this lever; for this purpose lever 25 has a nose or projection 25B.

The centrifugal type friction-clutch coupling with a free-wheeling is the part of the two-speed drive for the generator 60 of the non-shown crank shaft. The drive is obtained with low motor speeds via the coupling belt pulley 11 with transmission $i_1$ (FIG. 5). Thereby the coupling is coupled, that is the torque $F_F \times q$ is greater than the torque $F_Z \times K$ and thereby the force of spring 33 is greater than the centrifugal force of lever 23 so that the friction coating 30 of the coupling jaw 29 is pressed against the friction surface 31. Thereby the belt pulley 12 (back gear pulley) overspeeds, that is the clamping wedges 45 to 47 will press against the stop pins 48 to 50 so that no friction connection between the clamping wedges and the circular extension 39 will be established. At higher speeds, for example over 2000/min the centrifugal force is so large that lever 25 is pivoted about point D and thus presses the spring 36 so that the coupling jaw 29 will be lifted from the friction surface 31. The centrifugal force coupling is thereby uncoupled, clamping wedges 45 to 47 will be driven into the sickle-shaped chambers 42, 43, 44 whereby the friction connection between the circular extension 39 and the hub 40 and thus the belt pulley 12 will be produced. The generator 60 will be also driven by the belt pulley 12 with a smaller transmission $i_2$.

The coupling is formed so that it is switched on or coupled when the torque of the forces acting on the lever 25, namely the spring force $F_F$, centrifugal force $F_Z$ and the resulting friction force $F_R$ —about the pivot point D-come from balance to imbalance. By the structure of the lever 25 and the coupling 29 as described above it is obtained that the friction force causes servo=amplifying effect. The amplification factor $$a = \frac{1}{1 - tg\,\gamma \times cotg\gamma}$$

depends upon the geometry of the lever 25 and coupling jaw 29, namely upon the construction angle $\gamma$ and friction value (friction angle) $\phi$ between the friction coating 30 and the friction coating 31. To meet the requirements of the coupling the first solution is that either none or a very small slip region must take place, and the second solution resides in that the coupling process must take place without damaging jerking and continual slip of the coupling. From the first requirement, the construction angle $\gamma = \phi_{static}$ results, whereby $\phi_{static}$ is equal to the angle at static friction.

For the coupling condition:

$$F_u = a_{slide} \times F_o \times tg\phi_{slide},$$

wherein $\phi_{slide}$=friction angle during the sliding friction;

$a_{slide}$=amplification factor during the sliding friction; and $F_o$=application force of the friction coating 30 to the friction surface 31 during the coupling process.

With given $\gamma$ and $\phi_{slide}$, the second requirement is satisfied by determining Fo during the coupling in dependence upon switch hysteresis of the coupling, and this is determined by arrangement of the spring and the pivoting angle of the lever 25.

The coupling is engaged when the torque of the forces acting on lever 25, as mentioned above, about the pivot point D, comes from balance to imbalance. For the sake of simplification bearing friction and acceleration forces and omitted.

The release takes place when: $F_{FL} \times q_L < F_{ZL} \times K_L$ coupling, when $F_{FE} \times q_E > F_{ZE} \times K_E$ (as seen in the diagram of FIG. 5).

By the selected embodiment and the construction of the spring the following equation is obtained.

$$F_{FL} \times q_L > F_{FE} \times q_E,$$

from which switching hysteresis and application force $F_o$ of the coupling jaw during the coupling is:

$$F_o = \frac{F_{FL} \times q_L - F_{FE} \times q_E}{\overline{AB} \times \sin \gamma}$$

The translated peripheral force $F_{uE}$ during the coupling can be adjusted during the assembly of the coupling by limiting the pivoting angle of lever 25 by means of the screw 52.

The support of the spring 33 is selected so that the pivot points 36A, 37A of the spring guides inside the spring lie at the distance from about one third of the spring length. It is thereby obtained that the function results with the flat region $\phi = 0 = \phi_L$ (constant release speed also when the friction coating is worn off) and a steeply descending branch of the curve with $\phi = \phi_E$ (required switch hysteresis with a small pivot angle). The inwardly - displaced spring support formed as a knife-edge-bearing is advantageous because it has small friction and high resistance to buckling. The spring moment is in the released position smaller than that in the coupled position.

The distance between points A,L must be as small as possible and then the change of the construction angle $\gamma$, upon the wear-off of the friction components, remains as small as possible.

The switching or coupling process is shown in the graph of FIG. 5 wherein $n_G$ is the speed of the generator 60 and $n_M$ is the motor speed. C- is the point (motor speed $n_{M2}$) in which the coupling is uncoupled, and the speed of the generator falls down to the point D. Now the free-wheeling takes place, and the generator is drive with a new transmission $i_2$. In this manner, the speed range of the generator is reduced by factor $2/i_1$. The speed difference between $n_M$, and $n_{M2}$ is the switching hysteresis of the coupling.

In the embodiment shown in FIG. 2, the centrifugal type friction-clutch coupling is mounted at the driven side of the generator. Both belt pulleys 11 and 12 are driven by the internal combustion engine and the diameters of the belt pulleys on the generator and crank shafts are again selected in the same fashion as that described for the embodiment of FIG. 1. Thereby the function of the coupling is the same. Pin 23 is now positioned on the fan wheel 14 and lever 25, pivotable on pin 23, cooperates via the friction coating with the coupling housing 24. The latter is here connected with the belt pulley 11 in contrast to the above described embodiment. Thus the centrifugal friction clutch coupling operates in a stable manner and its switch hysteresis must be $> n_{M2} \times (i_1 - i_2)$.

It will be understood that each of the elements described above, or two or more together, may also find a useful application in other types of two-speed drives differing from the types described above.

While the invention has been illustrated and described as embodied in a two-speed drive for a generator driven by an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims; I claim:

1. A two-speed drive for a generator of an internal combustion engine, comprising two coupling belt pulleys of different diameters; a centrifugal type friction-clutch coupling, said coupling including a friction surface, an acutating lever formed a a flyweight and having a first pivot axis on which said lever is pivotally supported, a spring acting on said lever against a centrifugal force, and a coupling jaw connected to said lever so as to be pressed thereby against the friction surface of said coupling, said lever having a second pivot axis, said coupling jaw being pivotally supported on said second pivot axis, said first and second pivot axes lying on a straight line which forms with a resulting normal force ($F_N$) of said coupling jaw, acting against said friction surface, an angle which corresponds to a friction angle ($\phi$) which occurs at a static friction between said coupling jaw and said friction surface; and free-wheeling means positioned between said two coupling belt pulleys, said genreator having a driving side, said coupling being positioned immediately at the driving side of said generator.

2. The drive as defined in claim 1, wherein said lever is pivotable on a belt pulley of a smaller diameter.

3. A two-speed drive for a generator of an internal combustion engine, comprising two coupling belt pulleys of different diameters; a centrifugal type friction-clutch coupling, said coupling including a friction surface, an actuating lever formed as a flywright and having a first pivot axis on which said lever is pivotally supported, a spring acting on said lever against a centrifugal force, and a coupling jaw connected to said lever so as to be pressed thereby against the friction surface of said coupling, said lever having a second pivot axis, said coupling jaw being pivotally supported on said second pivot axis, said first and second pivot axes hying on a straight line which forms with a resulting normal force ($F_N$) of said coupling jaw, acting aginst said friction surface an angle which corresponds to a friction angle ($\phi$) which occurs at a static friction between said coupling jaw and said friction surface; and free-wheeling means positioned between said two coupling belt pulleys, said generator having a driven side, said coupling being positioned immediately at the driven side of said generator.

4. The drive as defined in claim 3, wherein said generator has a fan housing and said lever is pivotable on said fan housing.

5. A two-speed drive for a generator of an internal combustion engine, said generator having a fan wheel having a housing, said dirve comprising two coupling belt pulleys of different diameters; a centrifugal type friction-clutch coupling, said coupling including a friction surface provided on said housing of said fan wheel, an actuating lever formed as a flyweight and haivng a first pivot axis on which said lever is pivotally supported, a spring acting on said lever against a centrifugal force, and a coupling jaw connected to said lever so as to be pressed thereby against the friction surface of said coupling, said lever having a second pivot axis, said coupling jaw being pivotally supported on said second pivot axis, said first and second pivot axes lying on a straight line which forms with a resulting normal force ($F_N$) of said coupling jaw, acting against said friction surface, an angle which corresponds to a friction angle ($\phi$) which occurs at a static friction between said coupling jaw and said friction surface; and free-wheeling means positioned between said two coupling belt pulleys, said coupling being positioned immediately in said housing of said wheel.

* * * * *